United States Patent Office 2,936,980
Patented May 17, 1960

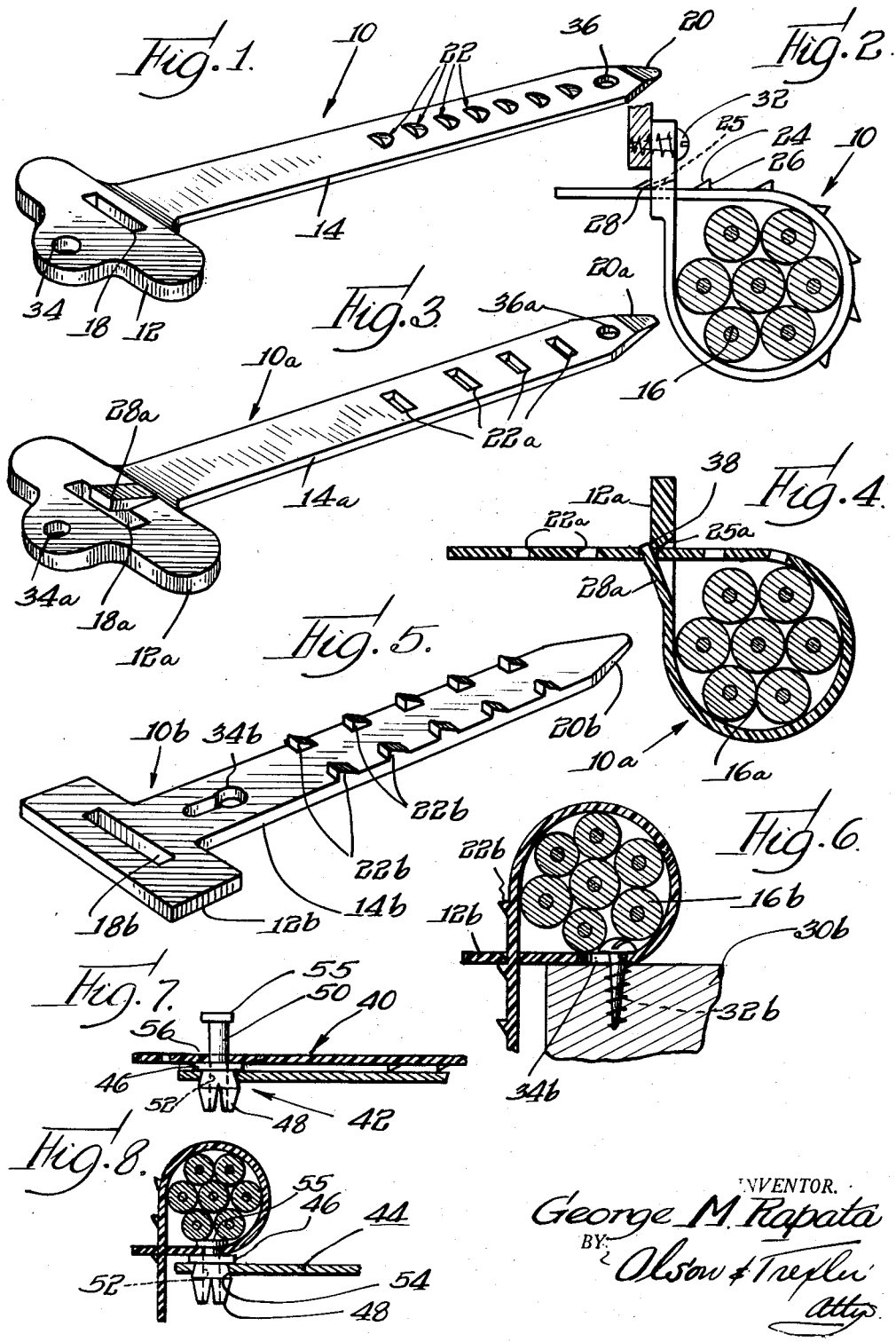

2,936,980
CABLE STRAP

George M. Rapata, Chicago, Ill., assignor to Illinois Tool Works, Chicago, Ill., a corporation of Illinois Application October 1, 1954, Serial No. 459,636

2 Claims. (Cl. 248—74)

The present invention relates to a novel device for securing one or more articles such as wires, cables, conduits and the like.

Various devices have heretofore been proposed for securing cables and like articles to walls or other workpieces, but such heretofore known devices have not always been satisfactory. For example, many of such prior devices are adapted to fit cables of only one size and, therefore, different sizes must be provided for each different size of cable and in the event it is desired to secure a plurality of cables or the like in a group. It is a primary object of the present invention to provide a novel securing device for one or more cables and the like, which device may be easily adjusted for securing cables of different sizes or for securing various groups of cables.

Another object of the present invention is to provide a novel cable securing device of the above described type which is of extremely simple and economical construction.

A more specific object of the present invention is to provide a novel one-piece cable and securing device made from flexible material such as plastic and capable of being wrapped and snugly fastened around cables or groups of cables and the like of various sizes without the aid of auxiliary fastening means such as screws and the like.

Still another object of the present invention is to provide a novel cable securing device of the above described type which may be readily fastened to a wall or any other desired workpieces or supporting structure.

Other objects and advantages of the present invention will become apparent from the following description and the accompanying drawings wherein:

Fig. 1 is a perspective view showing a cable securing device or strap embodying the principles of this invention;

Fig. 2 is a cross sectional view showing the device of Fig. 1 applied to a cable and fastened to a workpiece or supporting structure;

Fig. 3 is a perspective view showing a cable securing strap embodying another form of the present invention;

Fig. 4 is a cross sectional view showing the strap of Fig. 3 applied to a cable;

Fig. 5 is a perspective view showing another modified form of the present invention;

Fig. 6 is a cross sectional view showing the cable strap of Fig. 5 applied to a cable and fastened to a workpiece;

Fig. 7 is a fragmentary cross sectional view showing a novel assembly including the cable strap of this invention and fastener means for securing the strap to a workpiece; and Fig. 8 is a cross sectional view showing the strap and fastener means of Fig. 7 in their finally assembled condition.

Referring now more specifically to the drawings wherein like parts are designated by the same numerals throughout the various figures, a cable securing device or strap 10 embodying the principles of this invention is shown in Figs. 1 and 2. The device 10 is in the form of a one-piece elongated member made of flexible material, which material is preferably a plastic material such as polyethylene. One end portion of the elongated member is enlarged to provide a head 12 from which an elongated shank or strap portion 14 extends. Preferably, the head portion is substantially thicker than the strap portion so as to be relatively rigid as compared to the strap portion.

As shown in Fig. 2, the securing device is adapted to be wrapped or looped around an article or articles to be secured, such as a group of cables 16, and opposite end portions of the device are secured together so as to retain the cable. In order to secure the opposite end portions of the device together, the head portion 12 is provided with a transverse slot 18 through which the strap portion 14 may be inserted. Preferably, the free end 20 of the strap portion is pointed in the manner illustrated to facilitate insertion thereof through the slot 18. A plurality of integral interlocking means in the form of protuberances 22 is formed on the strap portion 14 and spaced longitudinally thereof. Each of the protuberances is formed with an inclined cam surface 24 facing toward the free end of the strap portion and a shoulder surface 26 extending generally perpendicularly from the strap portion and facing toward the head portion.

When the free end of the strap is inserted through the slot 18 in the manner shown in Fig. 2, the cam surfaces on the protuberances serve to slightly compress the protuberances and/or slightly expand the slot so as to facilitate passage of the protuberances through the slot. Passage of the protuberances through the slot may be further facilitated by forming the slot with an inclined edge 25 as shown in Fig. 2. Once the protuberances are inserted through the slot, they are prevented from being withdrawn from the slot by interengagement of the shoulder surface 26 with means on the head portion 12, which means, in the embodiment illustrated in Figs. 1 and 2, is an inner marginal edge of the head portion 28 defining one side of the slot. It will be appreciated that the diameter of the loop formed by the strap portion may be easily adjusted merely by selectively positioning one of the protuberances for interlocking engagement with the head portion. Thus, it is seen that the securing device 10 may be easily applied to and readily adjusted for snugly retaining cables and the like of various diameters or various groups of cables and the like.

The securing device 10 may be easily fastened to a workpiece or support member 30 by various fastening devices such as a screw 32. Preferably, the device 10 is provided with an aperture through which the screw may be inserted. In the embodiment shown, an aperture 34 is provided in the head portion for receiving the screw. With the aperture in this position, the securing device may be fastened to the workpiece either before or after the strap portion is wrapped around the cable to be retained and inserted through the slot 18. In addition, an aperture 36 may be provided adjacent the free end of the strap portion. In certain installations, it may be more convenient to fasten the securing device to the workpiece by means of a screw extending through the aperture 36. In such cases, it will be appreciated that the securing device will be applied to the cable before the screw is inserted through the aperture 36.

Figs. 3 and 4 show a modified form of the present invention which is similar to the above described structure as indicated by the application of identical reference numerals with the suffix "a" added to corresponding elements. This embodiment differs only in that the interlocking means 22a and 28a on the shank portion 14a and head portion 12a, respectively, have been modified. More specifically, the above described protuberances 22 have been replaced by a plurality of slots or openings 22a spaced along the shank or strap portion 14a. Also, in place of the above described interlocking marginal portion 28, the device 10a is provided with a lug 28a formed at the head portion and extending into the slot 18a.

As shown in Fig. 4, the device 10a is looped around a cable in the same manner as the device 10 and the opposite ends of the device 10a are secured together by interlocking engagement between the lug 28a and one edge of one of the openings or slots 22a. Preferably, the lug 28a is inclined in the manner shown so as to facilitate insertion of the strap portion into the slot 18a. In addition, the lug 28a is preferably formed so that it completely traverses the slot 18a whereby the free end of the lug is engageable with a marginal edge 38 of the slot positively to prevent unauthorized or accidental withdrawal of the strap from the slot. It will be appreciated that when desired, the strap may be withdrawn from the slot by manually bending the lug so as to clear the slot.

Figs. 5 and 6 show another form of the present invention which is similar to the above described embodiments as indicated by the application of identical reference numerals with the suffix "b" added to corresponding elements. This embodiment differs from the device 10 in that in place of each of the above described protuberances 22 which are centrally located between marginal edges of the strap, pairs of protuberances 22b are provided adjacent opposite marginal edges of the strap 14b. This arrangement has the advantage of reducing any tendency of the head portion and strap portion to twist relative to each other, which twisting might inadvertently allow the protuberances to slip back through the slot.

In order to fasten the device 10b to a workpiece or supporting structure, a keyhole slot or aperture 34b is provided. With such a keyhole slot, the fastening device may be slipped onto a screw member 32b which has already been applied to the workpiece. As shown in the drawings, the keyhole slot may be formed in the strap portion adjacent the head portion so that the securing device may be slipped onto the screw member either before or after it is applied to the cable to be retained. If desired, however, the keyhole slot may be formed in the head portion or in the strap portion adjacent the free end thereof. It is understood that the screw receiving apertures of the embodiments shown in Figs. 1 through 4 may be replaced by keyhole slots similar to the slots 34b.

In Figs. 7 or 8, there is shown a novel combination of a securing device 40 which may be in the form of any of the above described embodiments and a fastening device 42 for mounting the securing device to an apertured workpiece or panel 44. The fastening device includes a one-piece plastic member having a head 46 and a plurality of expandable shank portions 48 extending from the head. A pin 50 having a diameter larger than the diameter of a bore 52 extending through the head and shank portions 46 and 48 is adapted to be driven into the bore to expand the shank portions so that outwardly flaring surfaces 54 thereof engage behind the panel. The pin 50 may be provided with an enlarged head 55 so that when it is driven from its initial position shown in Fig. 7 to the position shown in Fig. 8, the head 55 serves to retain the securing device 40. The pin 50 may initially be integrally interconnected with the head 46 as at 56 and in this event, the securing device 40 should be provided with a keyhole slot so that it may be slipped onto the pin. If desired, the pin may be made separate from the head 46 and the securing device 40 may be provided with a simple round aperture adapted to receive the pin. With this structure, it is seen that the combination of relatively simple and economical plastic elements is provided whereby a cable or the like may be securely retained and easily fastened to an apertured workpiece or panel.

From the above description it will be appreciated that the present invention has provided an extremely simple and economical one-piece plastic securing device which is fully capable of satisfying the objects heretofore set forth. More specifically, it is seen that the securing device of the present invention may be easily applied to cables of varying diameters and adjusted to snugly retain such cables. Furthermore, it is seen that the novel securing device may be formed so that it can be easily fastened to a workpiece or support structure either before or after it is wrapped or looped around a cable.

While the preferred embodiments of the present invention have been shown and described herein, it is obvious that many structural details may be changed without departing from the spirit and scope of the appended claims.

The invention is claimed as follows:

1. A securing device adapted for retaining an elongated workpiece such as a group of cable-like elements in suspension from a support; said device comprising a generally flat member made of flexible plastic material including an elongated relatively thin and narrow strap portion of rectangular cross-section and a head adjacent one end thereof which is transversely thicker than the body of said strap portion substantially throughout the longitudinal extent thereof, a plurality of locking elements integral with and projecting from one surface of said strap portion and spaced longitudinally therealong, said integral locking elements projecting outwardly from the face of said strap portion a distance substantially as great as the thickness of said strap portion, each of said locking elements presenting a locking shoulder facing toward the head extremity of the strap portion and a cam surface extending in the opposite direction from the outer extremity of the locking shoulder and toward the adjacent strap surface, said relatively thick head portion having a rectangular aperture therethrough disposed adjacent the area of merger between the head and strap portion and conforming substantially with the rectangular cross-section of said strap portion and adapted to accommodate the free extremity of said strap portion to permit lacing of the strap portion therethrough to form a loop for receiving the aforesaid elongated workpiece with sufficient area of the relatively thick head remaining outwardly of the aperture to receive a fastening element for attachment to a support, said head although thicker than the body of the strap portion being sufficiently resilient to flex as an incident to the forced passage of the locking elements through said rectangular aperture but presenting substantially the thickness of the head material to an inserted locking shoulder whereby to assure firm locking abutment of an inserted locking shoulder against the relatively thick head and resist reverse movement of the strap portion under influence of the weight of the assembly when suspended by the head from a support.

2. A securing device as claimed in claim 1, wherein the edge of the aperture in the head remote from the strap portion is inclined substantially complementally to the cam surfaces on the locking elements to facilitate passage of the said locking elements through the aperture.

References Cited in the file of this patent

UNITED STATES PATENTS

| | | |
|---|---|---|
| 441,838 | Greenfield | Dec. 2, 1890 |
| 467,967 | Allen | Feb. 2, 1892 |
| 771,331 | Spector | Oct. 4, 1904 |
| 876,402 | Schacht | Jan. 14, 1908 |
| 1,278,779 | Springer | Sept. 10, 1918 |
| 2,310,434 | Hyman | Feb. 9, 1943 |
| 2,342,958 | Morehouse | Feb. 29, 1944 |
| 2,373,833 | Johnson | Apr. 17, 1945 |
| 2,466,742 | Roehrl | Apr. 12, 1949 |
| 2,542,144 | Kearns | Feb. 20, 1951 |
| 2,601,803 | Newman | July 1, 1952 |